US008817315B2

(12) United States Patent
Gupta et al.

(10) Patent No.: US 8,817,315 B2
(45) Date of Patent: Aug. 26, 2014

(54) INTEGRATING TARGETED ADS IN FAXES

(75) Inventors: Shekhar Gupta, Overland Park, KS (US); Mike A. Roberts, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 755 days.

(21) Appl. No.: 12/112,378

(22) Filed: Apr. 30, 2008

(65) Prior Publication Data
US 2009/0273810 A1 Nov. 5, 2009

(51) Int. Cl.
H04N 1/00 (2006.01)
G06F 3/12 (2006.01)
G06K 15/00 (2006.01)
G06Q 30/00 (2012.01)

(52) U.S. Cl.
USPC ......... 358/1.18; 358/406; 358/407; 358/1.13; 358/1.15; 358/1.16; 705/14.49; 705/14.57; 705/14.58; 705/14.67; 705/14.72; 705/14.73

(58) Field of Classification Search
None
See application file for complete search history.

(56) References Cited

U.S. PATENT DOCUMENTS

| | | | |
|---|---|---|---|
| 6,404,994 B1 * | 6/2002 | Kawai et al. | 399/6 |
| 6,574,467 B1 | 6/2003 | Jonsson | |
| 6,906,812 B2 * | 6/2005 | Koakutsu et al. | 358/1.13 |
| 2001/0032266 A1 * | 10/2001 | Minowa | 709/229 |
| 2003/0081756 A1 | 5/2003 | Chan et al. | |
| 2006/0271424 A1 * | 11/2006 | Gava et al. | 705/14 |
| 2006/0287920 A1 * | 12/2006 | Perkins et al. | 705/14 |
| 2007/0115498 A1 * | 5/2007 | Noel et al. | 358/1.15 |
| 2008/0140502 A1 * | 6/2008 | Birnholz et al. | 705/10 |
| 2008/0177626 A1 | 7/2008 | Nguyen | |
| 2009/0268890 A1 | 10/2009 | Gupta | |

FOREIGN PATENT DOCUMENTS

JP 2002015374 * 1/2002

OTHER PUBLICATIONS

Kurozasa Yoshiharu; "Advertisement Distribution . . . Image Formation Device"; JP Pub Date Jan. 2002; Machine translation in english for JP Pub No. 2002-015374.*
U.S. Appl. No. 12/108,029; Final Rejection dated May 7, 2012; 11 pages.
U.S. Appl. No. 12/108,029; Non Final Office Action dated Dec. 6, 2011; 7 pages.
U.S. Appl. No. 12/108,029; Non Final Rejection dated Apr. 12, 2013; 14 pages.
U.S. Appl. No. 12/108,029; Final Rejection dated Sep. 23, 2013; 14 pages.
U.S. Appl. No. 12/108,029; Non Final Rejection dated Apr. 25, 2014; 13 pages.

* cited by examiner

Primary Examiner — Benny Q Tieu
Assistant Examiner — Haris Sabah
(74) Attorney, Agent, or Firm — Swanson & Bratschun, L.L.C.

(57) ABSTRACT

A system and method for inserting an advertisement for a document to be faxed. In this embodiment, a processor may be configured to determine a category associated with content in a document being faxed. The processor may select at least one advertisement that is related to the associated category. A determination may be made for a location within the document being communicated for one or more advertisements to be positioned. The processor may be further configured to place one or more selected advertisement into the determined location in the document being communicated.

13 Claims, 2 Drawing Sheets

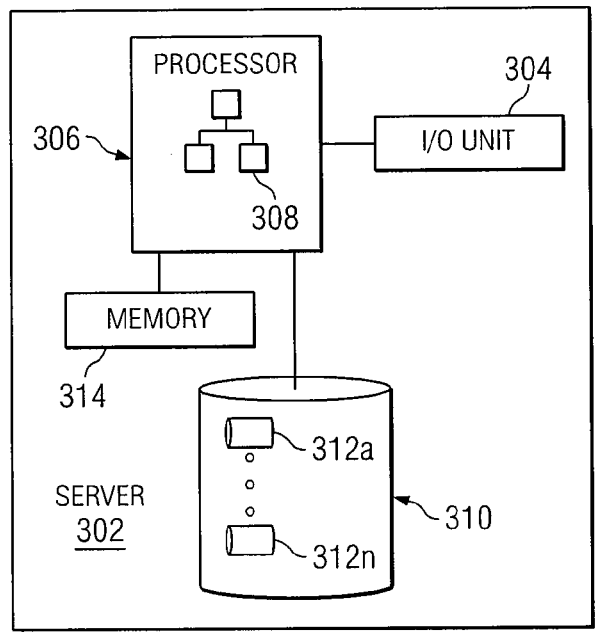
FIG. 3
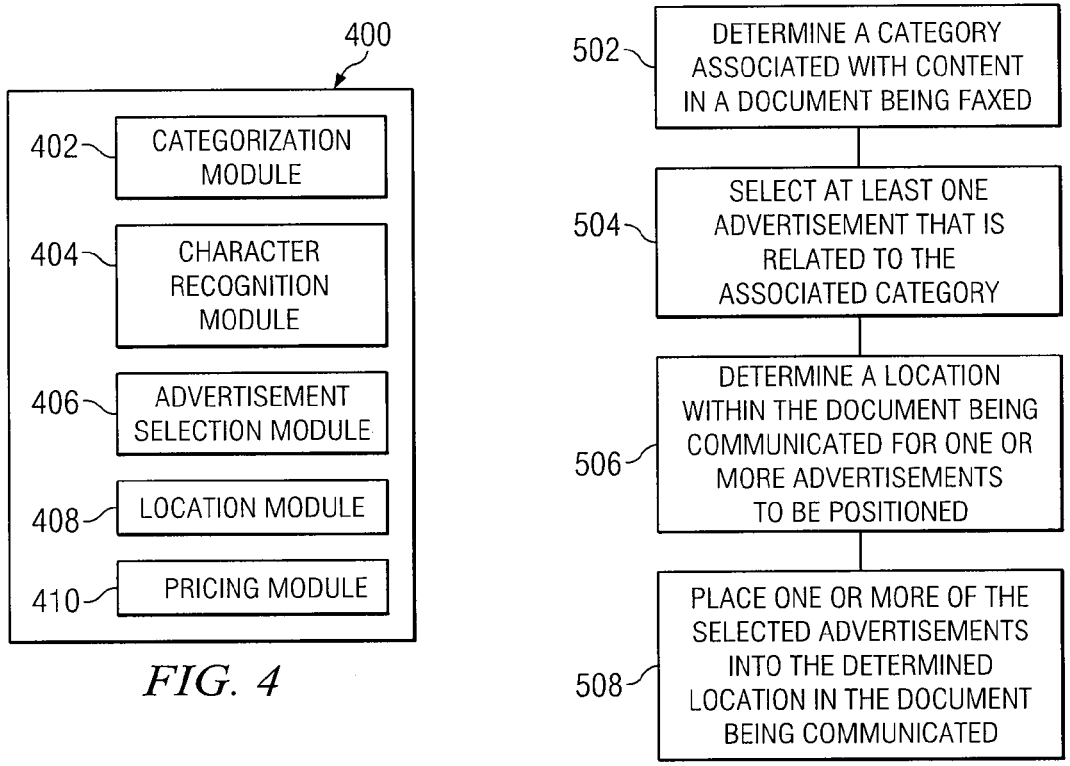
FIG. 4
FIG. 5

INTEGRATING TARGETED ADS IN FAXES

BACKGROUND OF THE INVENTION

As long as there have been products to sell and services to promote, forms of advertising for publicity have been developed. Many different advertising mediums have been used over the years including word of mouth, print, radio, and television, to name a few. As new mediums are created, methods to benefit from the different mediums quickly seem to follow, with advertising revenue generation being one important benefit.

Increasingly, the Internet is being used to provide advertisements to users "surfing the web." An advertisement may be provided through web browsers with the advertisement appearing in a pop-up window, within, or surrounding requested content viewed on a web page. Advertisements are frequently linked to websites providing additional information on the product or service being advertised. By clicking on a displayed advertisement, revenue may be generated for the owner of the website being viewed when the advertisement is displayed (a "pay-per-click" model). Revenue may also be generated by keeping track of the number of times or duration in which the advertisement is displayed.

Free e-mail services typically are supported through advertisements being added to e-mails sent and received by e-mail account holders. In addition, an e-mail provider customarily receives revenue from advertisers whose ads appear in banners on the email website for account holders to view.

A relatively new concept that is related to free e-mail services is online faxing services. Online faxing services allow users to visit a website and create faxes by typing messages directly on the website, scanning paper documents, or attaching electronic documents to an electronic "fax" transmission. Other online faxing services operate as software on a users computer with capabilities similar to faxing services initiated from a website. At this time, advertisements that are displayed to a user, if any, occur only on the website where the fax is being generated and at the bottom of a coversheet provided with faxed documents for a recipient to view.

BRIEF SUMMARY OF THE INVENTION

To generate additional advertising revenue, content of an electronic document being transmitted by an online fax service provider, including documents that were not previously in electronic form as well as attachments, the online fax service provider may include advertisements closely related to the content in a fax, thereby making the advertisements more valuable to an advertiser. Additionally, by determining a location within the fax with space available for an advertisement, the advertisement may be placed more effectively within the fax to avoid content being obscured.

One embodiment includes a system and method for inserting an advertisement for a document to be faxed. In this embodiment, a processor may be configured to determine a category associated with content in a document being faxed. The processor may select at least one advertisement that is related to the associated category. A determination may be made for a location within the document being communicated for one or more advertisements to be positioned. The processor may be further configured to place one or more selected advertisement into the determined location in the document being communicated.

BRIEF DESCRIPTION OF THE DRAWINGS

Illustrative embodiments of the present invention are described in detail below with reference to the attached drawing figures, which are incorporated by reference herein and wherein:

FIG. 3 is a block diagram of exemplary components of a server configured to facilitate inserting an advertisement into a fax;

FIG. 4 is a block diagram of exemplary modules for inserting an advertisement into a fax; and FIG. 5 is a flow chart of an exemplary process for inserting an advertisement within a fax in accordance with the principles of the present invention.

DETAILED DESCRIPTION OF THE INVENTION

Figure 1:
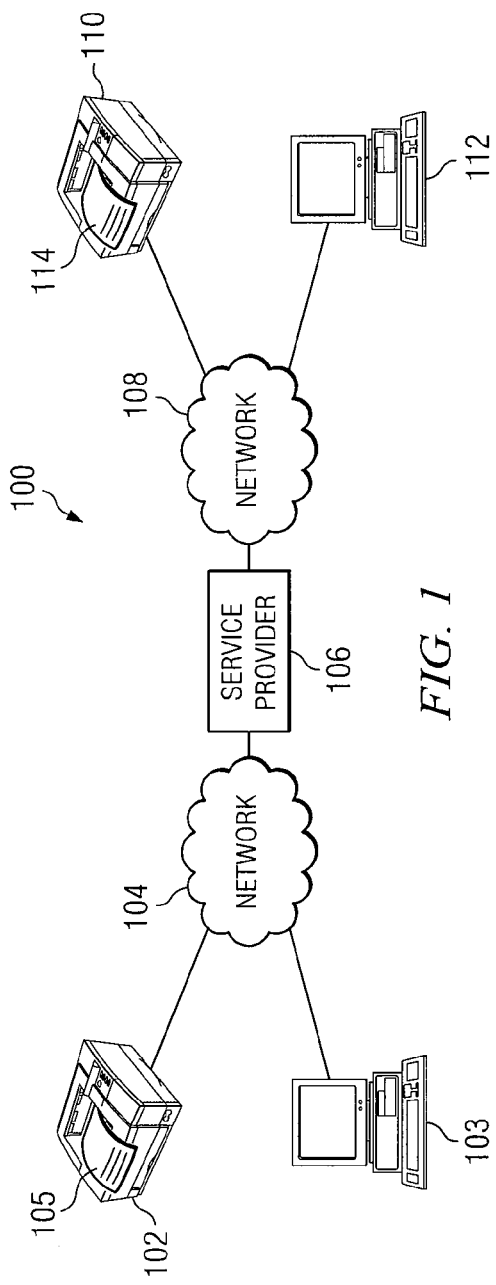
FIG. 1 is an illustration of an exemplary environment for inserting an advertisement within a fax.

FIG. 1 is an illustration of an exemplary environment 100 for inserting an advertisement within a fax. In this embodiment, a fax machine 102 or computing device 103 may communicate over a network 104 to a service provider 106 capable of receiving faxed content. The content of a fax may include not only the text of a document 105, but any pictures, images, and attachments that may be included in the fax. For purposes of this description, a fax may be any electronic communication communicated via a facsimile communications protocol, and is used in context as understood in the art. The fax machine 102 may be a traditional fax machine that uses a modem or similar device to communicate over a telephone line or similar network to a receiving device. The fax machine 102 scans document 105 and converts the document into a digital image for fax transmission. Processing capability on the fax machine 102 is generally limited to the conversion of the document 105 into a digital image via a scanning process on the sending end and conversion of the digital image into a paper document on the receiving end. Recently, some fax machines have become available with a connection to the Internet over an Ethernet port located on the fax machine or over a wireless Internet connection. With the addition of Internet connectability, the fax machine 102 may be capable of greater processing capabilities than previously available. By connecting to a service provider 106 during the conversion of the paper document, the fax machine 102 may be able to incorporate an advertisement into the documents being faxed. A more detailed description for incorporating an advertisement into a fax is described below in reference to FIG. 4.

The traditional fax machine 102 is no longer the only device used for sending a fax, as understood in the art. More frequently, faxes are being composed and arranged on a computing device 103. The computing device 103 may communicate over a network 104 to a service provider 106. The service provider 106 may include a fax server (not shown) capable of receiving, storing, and processing faxes. The service provider 106 may provide the ability to insert advertisements into the document being faxed, as is described in more detail in FIG. 2. The computing device 103 may be capable of composing a fax by accepting direct entry of text, attachments of documents that have already been composed, or any other input customary for a computing device 103.

The network 104 may be a public switched telephone network (PSTN), the Internet, or any other network capable of transferring the digital image of the content being faxed. The service provider 106 may be the operator of the network, such as a telephone company, an Internet Service Provider (ISP) or an unrelated party, such as a vendor that stores advertisements for insertion into faxes. The actual selection and insertion of advertisements is explained in greater detail in FIGS. 2 and 4. After the advertisement is inserted at the service provider 106, the fax may then be communicated over a network 108 to a receiving device, such as a fax machine 110 or computing device 112. Network 108 may be the same as network 104. Similar to the sending devices described earlier, receiving devices may be capable of communicating via the network 108 and be able to receive the communicated faxes. If the receiving device is a fax machine 110, the fax may be converted to paper form to produce document 114. If the receiving device is a computing device 112, the fax may remain digital, being viewed using software on a computing device, or the document may be printed with an attached printer (not shown). Additionally, if the fax remains digital, advertisements located within the fax may be linked to websites of the sponsoring advertisement. This may provide for additional revenue using a "pay-per-click" model similar to what occurs when a user clicks on an advertisement when viewing a website.

Figure 2:
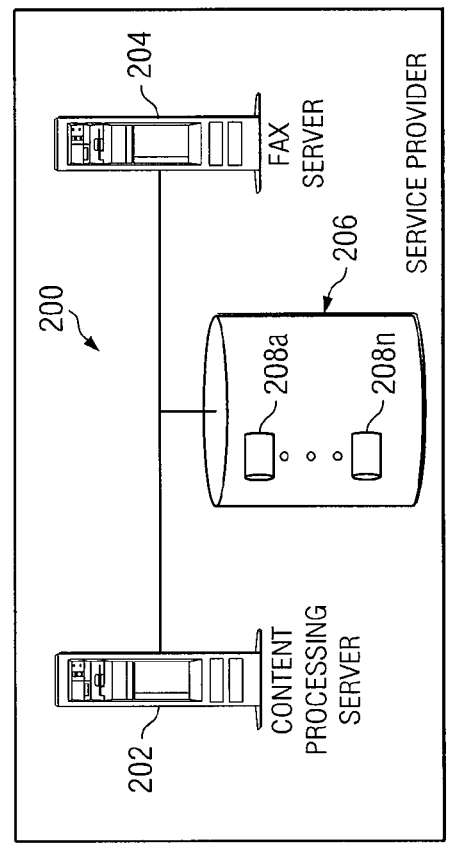
FIG. 2 is an illustration of exemplary network equipment of a service provider configured to insert an advertisement into a fax.

FIG. 2 is an illustration of exemplary network equipment 200 of a service provider configured to insert an advertisement into a fax. Within the service provider may be a content processing server 202 in communication with a fax server 204. The content processing server 202 may be configured to analyze a document being communicated in a facsimile format over the network to determine the content of the document. The fax server 204 may be configured to receive, store, and send faxes, as well as other routine server functions as known in the art. The content processing server 202 and fax server 204 may additionally be in communication with a data storage device 206, which may contain one or more data storage repositories 208a-208n (collectively 208). The data storage device 206 may be any form of data storage devices, such as a hard drive or collection of hard drives, memory, or any removable media capable of storing data. The data storage units 208 may be a file, collection of files, database, or any other storage unit capable of organizing the data stored therein.

For faxes that are received from the fax machine 102 or computing devices 103, the content processing server may be capable of determining the topic or category that the document relates to by performing optical character recognition (OCR), as understood in the art, on the fax. Generally, any words that are within the content being faxed may help to categorize the fax. In the event that no categories are able to be determined, a default advertisement may be inserted. If a topic or category is able to be determined, the content processing server may communicate with the data storage device 206 to retrieve a stored advertisement.

For faxes that are received from a computing device 103, the content processing server may not have to perform optical character recognition on the document, but may analyze the communicated content to determine a suitable category. One way to analyze the content may be to recognize key words that are unique to a particular topic or category or to recognize a pattern of a particular word being repeated. There are any number of methods that may be used to categorize content in documents, with keyword recognition just being used as an example.

For the principles of the present invention, advertisements and categories, along with the categories' associations, may be stored in data storage repositories 208, along with any other data that may be desired. TABLE 1 depicts a sample database table including categories along with associated advertisers with advertisements that may be included. In other words, if the content processing server 202 determines that the best fit for the document is the cellular providers category, an advertisement for Verizon, which is associated with cellular providers, may be inserted. In the event that an advertisement does not clearly fit within a category, the closest available category may be selected. For example, Kroger (a grocery store), while not a restaurant, is related to food, and may be placed under the restaurant category.

TABLE 1

| Categories | Advertisers |
|---|---|
| Restaurants | Pizza Hut, Outback Steakhouse, Kroger |
| Cellular Providers | Verizon, Cingular, T-Mobile, Sprint |
| Travel | Royal Caribbean, AAA, Hertz |
| Investing | Charles Schwab, JP Morgan, Bank of America |

In addition to the categorization of the fax's content, the content processing server 202 may also be configured to determine locations within the fax in which advertisements may be placed. Some considerations may include the available white space or prominence of available space. In the event that there is no sufficient white space within the fax, the image size of the content may be reduced to allow space for an advertisement to be placed. The reduction may be a fixed dimension (e.g. an inch) or a percentage of the image (e.g. 10%). Selection for the location of the advertisement may vary based upon available space and the size of the advertisement that is placed in the fax.

The fax server 204 may be configured to receive and send faxes. Faxes may be received from the network 104 and are stored in the fax server 204 electronically. The fax server 204 may be in communication with the content processing server 202 and the data storage device 206. The fax server 204 may be an initial recipient of the fax at the service provider, and may communicate the data to the content processing server 202. After the content processing server 202 has inserted or placed the advertisement into a fax, the fax server 204 may then route the fax to a recipient. In one embodiment, the fax server 204 may communicate the fax back to the fax machine 102 over the Internet connection, and the fax machine 102 may be responsible for delivering the fax message, in which an advertisement will be placed, to the recipient. In another embodiment, the fax server 204 may communicate the fax message with an advertisement to the recipient.

In alternate embodiments there may be a single server or multiple servers that perform similar functions. The content processing server 202 and the fax server 204 may alternatively be configured in a single server.

FIG. 3 is a block diagram of exemplary components of a server 302 configured to facilitate inserting an advertisement into a fax. The server 302 may perform functions similar to the two servers (202 and 204) described in FIG. 2 or may be another server that is in communication with the fax devices. The server 302 may include an input/output (I/O) unit 304 for receiving and transmitting faxes. The server 302 may also include a processor 306 for processing the communication of the faxes as well as the selection and placing of the advertisements. The processor 306 may execute software 308 capable of providing selection of an advertisement, processing the communication of the fax, and placing of the advertisement within the fax, among other functions. These functions are described below in greater detail in reference to FIG. 4, which details exemplary software modules.

A storage unit 310 may also be included in the server 302. The storage unit 310 may be a hard drive or any other type of non-volatile memory capable of storing data. Within the data repository 310 may be one or more databases 312a-312n capable of storing and organizing data, such as advertising content. In one embodiment, rather than including a storage unit 310, the server 302 may use memory 314 that is large enough to store sufficient content for a service provider's typical use. Additionally, a separate data device, similar to data storage device 206, may be in communication with the server 302, and may be sufficient for the storage of advertisements and category selection data, making the storage unit 310 unnecessary. The memory 314 may also be located within the network server 302 for storing data being processed by the processor 306.

FIG. 4 is a block diagram of exemplary modules 400 of software 308 (FIG. 3) for inserting advertisements within a fax. A categorization module 402 may be configured to determine categories that may be associated with a fax. For example, the categorization module 402 may call character recognition module 404 (such as an OCR module as previously described), to determine the topic of the fax or a category into which the fax may be placed. If the fax is received already in digital form where no character recognition is needed, the categorization module 402 may look for key words, unique words, or repeated words to determine what category of advertisements may be most related to the content of the fax. For example, if the fax content appeared to be related to a stock transaction, the categorization module 402 may associate the fax with investing, and may request an advertisement from the advertisement selection module 406 that is related to investing.

The character recognition module 404 may also be capable of determining where white space appears in the document being faxed. Working in communication with the location module 408, an appropriate space for the advertisement may be determined. If sufficient space for the selected advertisement cannot be found, the location module 408 may override the size of the received fax and adjust the image size in order for an advertisement to be placed within the fax.

The advertisement selection module 406 may select an advertisement based on the category provided by the categorization module 402. If there are no related advertisements, the advertisement module 406 may select a random advertisement or may have a default list in which to choose. If a category cannot be determined by the categorization module 402, the advertisement selection may also choose from a default list, or at random, as well.

A pricing module 410 may determine a cost, if any, for a fax to be sent. A fax service provider may allow a user to select whether or not an advertisement is to be inserted within the fax. If the user opts for an advertisement to be inserted within the fax, either the fax may be communicated for free, or a reduced rate applied. In another embodiment, the user may be charged a flat fee or a per-fax fee, which the pricing module 410 may determine, regardless of user advertising opt-in preference.

FIG. 5 is a flow chart of an exemplary process for inserting advertisements within a fax in accordance with the principles of the present invention. A category associated with content in a document being faxed may be determined in step 502. Keywords, repeated words, or any other method available for categorization may be used. At least one advertisement that is related to the associated category may be selected in step 504. By determining the most closely related advertisements to the associated category, a relevant advertisement may be chosen. As mentioned previously, if no category is closely associated, a random advertisement may be chosen instead. A location within the document being communicated for one or more advertisements to be positioned may be determined at step 506. Considerations may include the desire to not overlap content already within the fax, a prominent location where the advertisement is likely to be seen, the desire to avoid unnecessary cluttering of the fax, as well as others. In step 508, one or more of the selected advertisements may be placed into the determined location in the document being communicated. In the event that there is no free space, the content may be adjusted in several ways to accommodate the ad, as previously mentioned.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for inserting an advertisement in a document being faxed, said method including:
   requesting approval from a fax service user for the insertion of the advertisement within the document being fax by a user;
   attempting to determine a category associated with content in the document being faxed by identifying a repeated word in the document being faxed;
   if the category associated with the content in the document being faxed is determined selecting the advertisement from a plurality of advertisements stored in a storage unit which the plurality of advertisement are related to the associated category;
   if the category associated with the content in the document is not determined, selecting a random advertisement from the plurality of advertisements stored in the storage unit;
   determining a location within the document being faxed for the selected advertisement to be positioned;
   placing the selected advertisement into the determined location in the document being faxed;
   providing free or reduced rates to the fax service user for faxing the document with the advertisement;
   displaying the selected advertisement within the fax in a clickable manner, thereby creating an additional revenue generating opportunity when the fax is viewed in digital form.

2. The method according to claim 1, wherein determining the category includes determining content of an attachment document attached to the document being faxed.

3. The method according to claim 1, wherein determining the category associated with the content being faxed further includes selecting the category by identifying a keyword related to the content in the document being faxed and by identifying the repeated word in the document being faxed.

4. The method according to claim 1, further comprising:
   determining if sufficient space is available in the document being faxed to place the advertisement; and
   if the sufficient space is not available, adjusting an image size of the content to provide the sufficient space for the advertisement.

5. The method according to claim 4, wherein adjusting the image size of the content includes reducing the image size of the content on a percentage basis.

6. The method according to claim 1, further comprising:
performing an optical character recognition on the document; and
determining content of the document to be faxed.

7. The method according to claim 1, wherein determining the category, selecting the advertisement, determining the location and placing the advertisement are performed by a computing unit on a communications network.

8. A system for inserting an advertisement in a document being faxed, said system including:
a storage unite including at least one data repository configured to store advertisements; and
a processor configured to:
request approval from a fax service user for the insertion of the advertisement within the document being fax by a user;
attempt to determine a category associated with content in the document being faxed by identifying a repeated word in the document being faxed;
if the category associated with the content in the document being faxed is determined, select at least one advertisement from a plurality of advertisements stored in said storage unit which the plurality of advertisements are related to the associated category;
if the category associated with the content in the document is not determined, selecting a random advertisement from the plurality of advertisements stored in the storage unit;
determine a location within the document being faxed for the selected advertisement to be positioned;
place the selected advertisement into the determined location in the document being faxed;
provide free or reduced rates to the fax service user for faxing the document with the advertisement; and
displaying the selected advertisements within the fax in a clickable manner, thereby creating an additional revenue generating opportunity when the fax is viewed in digital form.

9. The system according to claim 8, wherein said processor, in determining the category, is further configured to determine the content in an attachment document attached to the document being faxed.

10. The system according to claim 8, wherein said processor, in determining the category associated with the content being faxed further configured to select the category by identifying a keyword related to the content in the document being faxed and by identifying the repeated word in the document being faxed.

11. The system according to claim 8, wherein the processor is further configured to:
determine if sufficient space is available in the document being faxed to place advertisement; and
if the sufficient space is not available, adjust an image size of the content to provide the sufficient space for the advertisement.

12. The system according to claim 11, wherein said processor, in adjusting the image size of the content, is further configured to reduce the image size of the content on a percentage basis.

13. The system according to claim 8, wherein said processor is further configured to perform an optical character recognition on the document being faxed to determine content of the document.

* * * * *